United States Patent [19]

Takach, Jr. et al.

[11] Patent Number: 4,830,328

[45] Date of Patent: May 16, 1989

[54] PORTABLE COMPUTER SYSTEM AND STAND FOR USE THEREWITH

[75] Inventors: Eugene J. Takach, Jr., Lake Zurich; Charles H. Culp, Mundelein, both of Ill.

[73] Assignee: Honeywell Inc., Minneapolis, Minn.

[21] Appl. No.: 42,139

[22] Filed: Apr. 24, 1987

[51] Int. Cl.⁴ ............................................. F16M 13/00
[52] U.S. Cl. .................................. 248/639; 248/1 B; 248/1 I; 248/359 E; 248/676; 273/DIG. 28; 364/708; 379/454
[58] Field of Search .................. 248/177, 1, 637, 639, 248/652, 676, 678, 359 E, 1 A, 1 B, 1 C, 1 I, 346, 463, 455, 454; 364/708; 273/DIG. 28; 379/96, 435, 454

[56] References Cited

U.S. PATENT DOCUMENTS

| | | | |
|---|---|---|---|
| 605,846 | 6/1898 | Bensene | 248/177 |
| 3,006,052 | 10/1961 | Stickney et al. | 248/177 |
| 4,571,456 | 2/1986 | Paulsen et al. | 248/455 |
| 4,579,338 | 4/1986 | Heffron | 273/DIG. 28 |
| 4,624,433 | 11/1986 | Henneberg | 248/346 |
| 4,624,434 | 11/1986 | Lake, Jr. et al. | 248/454 |

FOREIGN PATENT DOCUMENTS 608653  9/1960  Italy .................................. 248/455

Primary Examiner—Ramon S. Britts
Assistant Examiner—David L. Talbott
Attorney, Agent, or Firm—Donald J. Lenkszua

[57] ABSTRACT

There is disclosed a portable computer system including a computer, a power supply for the computer and a plate assembly which provides a support for the power supply external to the computer and a foot for disposing the computer in a desired position. The plate assembly includes a first plate to which the computer is attached, a second plate to which the power supply is attached and a hinge coupling the first and second plates together. The hinge allows the plates to be in substantial planar alignment or at an angle to each other to permit the second plate to function as a foot for the computer.

7 Claims, 5 Drawing Sheets

4,830,328

PORTABLE COMPUTER SYSTEM AND STAND FOR USE THEREWITH

BACKGROUND OF THE INVENTION

This invention pertains to a portable computer system and to a stand for use with a computer.

Honeywell Inc. has developed a portable computer system which is used as a diagnostic tool for testing and maintenance of complex systems. This system, which is referred to as MENTOR, has been reported in USA Today, Feb. 17, 1986; the Denver Post, Apr. 5, 1986, Section C, Page 1-C; High Technology, April, 1986, Page 9; and Business Week, Feb. 10, 1986, Page 93. The MENTOR system utilizes a lap type personal computer which is used to read remotely acquired sensor data from HVAC equipment. The computer is used to analyze the data and to compare it to a data base to determine whether system degradation has occurred or the problem exists. One feature of the MENTOR system is that the computer may be mounted on a tripod. Most specifically the computer and its power supply are in a carrying case along with a power supply. Originally, the carrying case itself which contained the computer and power supply was mounted to a tripod. This original arrangement proved to be unstable and have poor heat disapation for the computer and power supply, and thus lead to a high failure rate. The invention described herein eliminates these problems.

SUMMARY OF THE INVENTION

In accordance with the principles of the invention a lap type computer is mounted on top of a first plate and the power supply for the computer is mounted on top of a second plate. The first and second plates are connected together by means of friction hinges. When the computer is to be stored, the two plates are disposed in planar alignment with each other. When it is desired to operate the computer, it is removed from its carrying case and the second plate is swung down so that it is at an angle to the first plate preferably an angle in the order of 90 degrees. With this arrangement the computer is placed at a convenient operating angle for the operator. Additionally the power supply is less likely to overheat since air currents can now move along the power supply to dissipate heat.

Further in accordance with the principles of the invention the second plate includes two portions at right angles to each other so that when the computer is in its operating position one portion of the second plate forms a rear foot for the computer.

Still further in accordance with the principals of the invention the first plate has affixed thereto a pipe flange or a straight coupling to which a tripod post may be connected. The resulting structure may then be supported on a tripod. With the structure on a tripod the second plate is swung down so that it is at an angle to the first plate so that air currents can more freely circulate around the power supply and dissipate any heat.

BRIEF DESCRIPTION OF THE DRAWING

The invention will be understood from a reading of the following detailed description in conjunction with the drawing in which.

DETAILED DESCRIPTION

Figure 1:
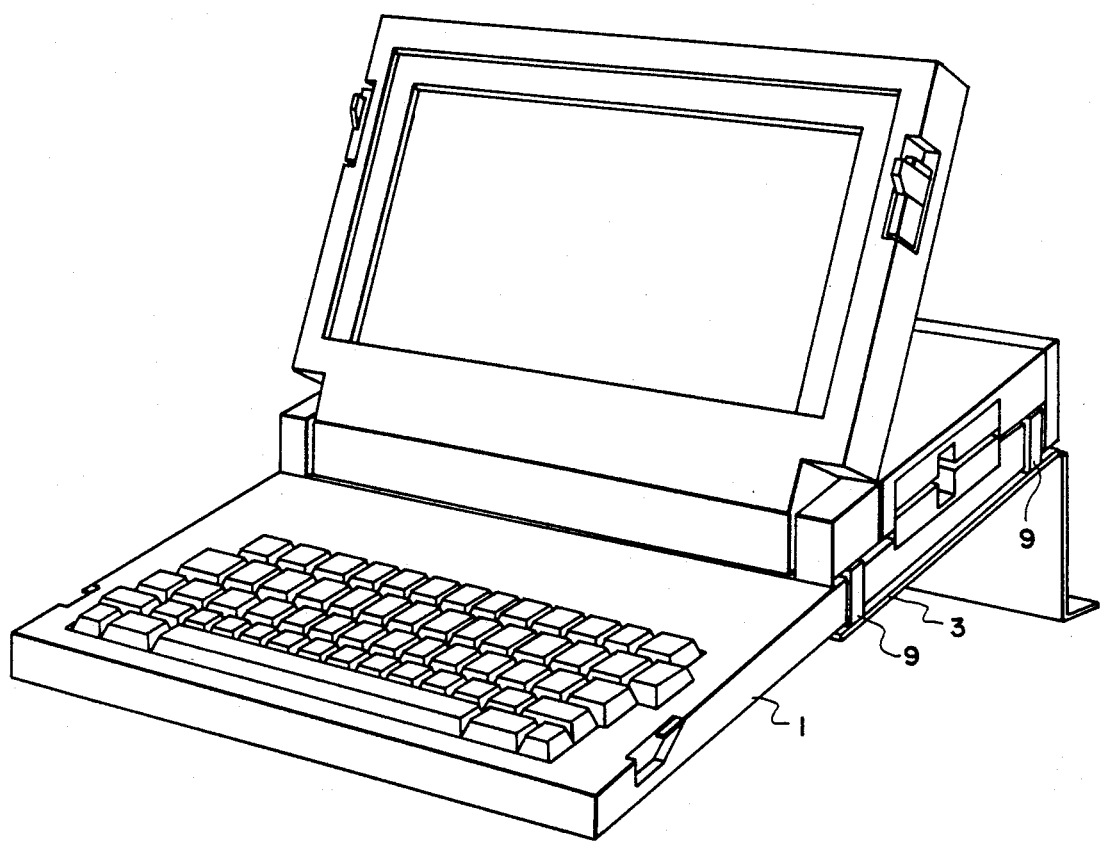
FIG. 1 is a side view of an assembly in accordance with the invention.
Figure 2:
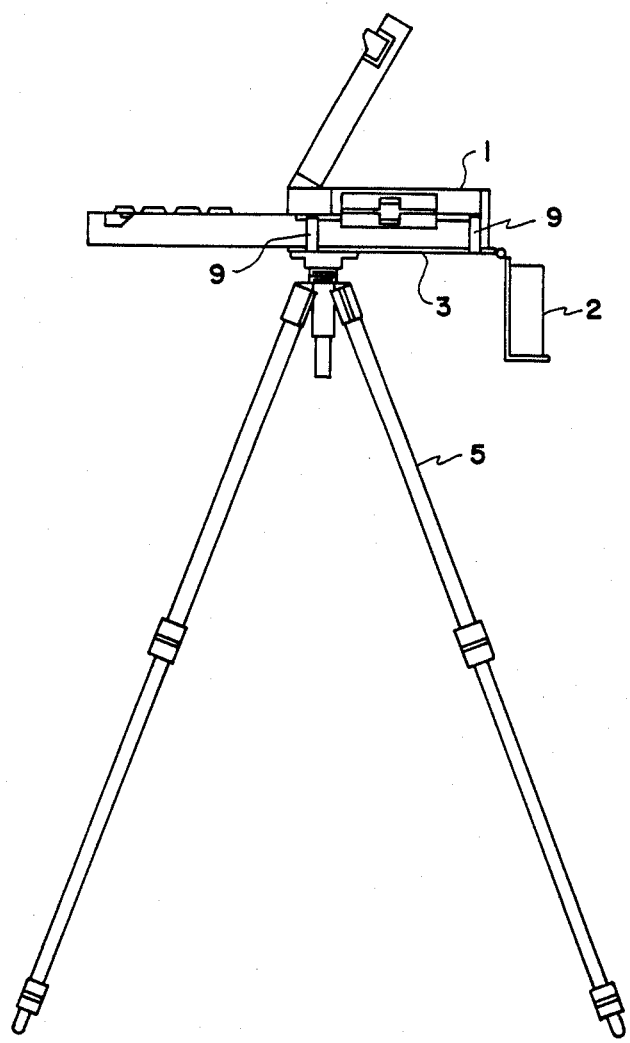
FIG. 2 is a perspective view of the assembly of FIG. 1 mounted on a tripod.
Figure 3:
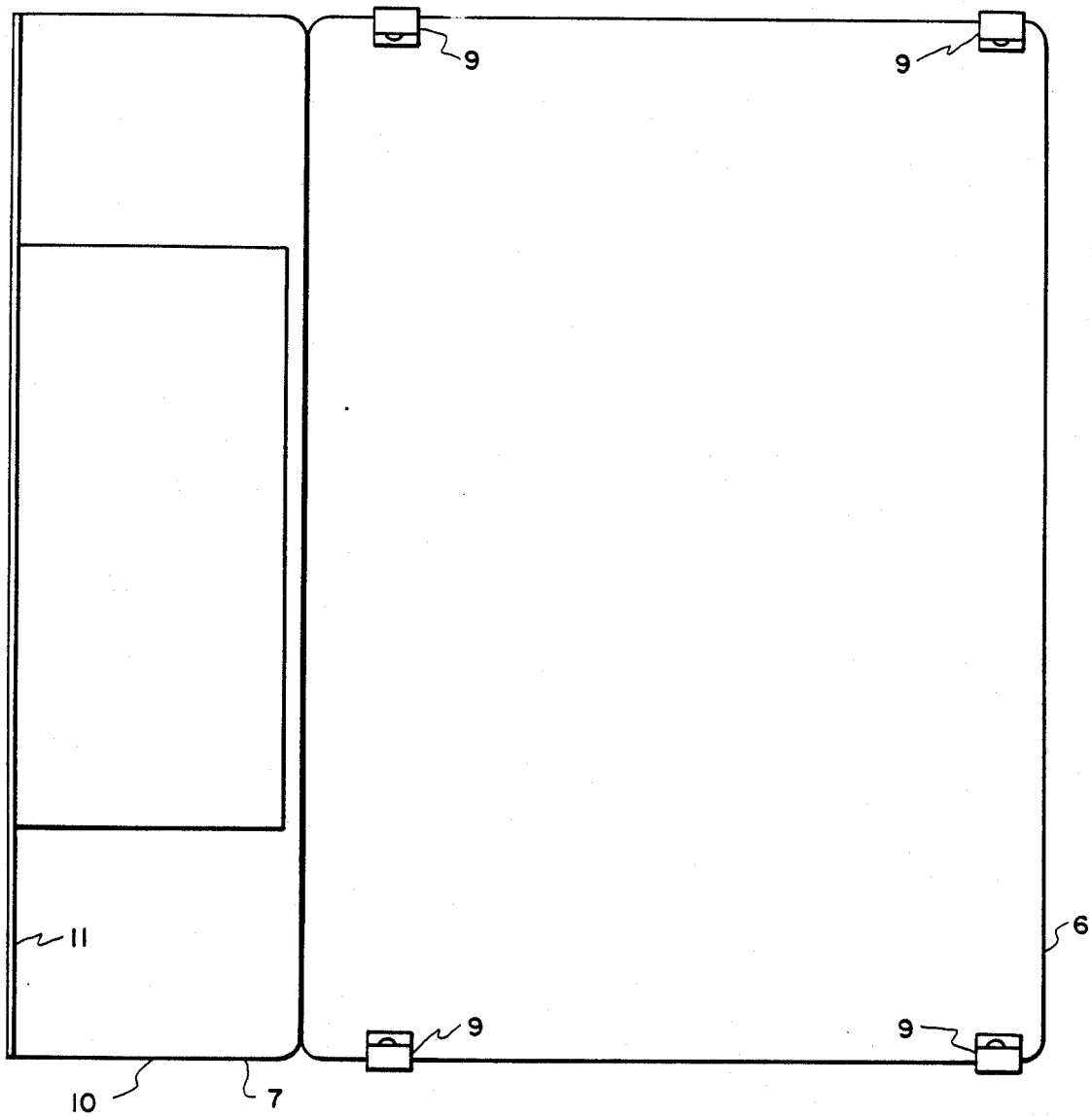
FIG. 3 is a top view of the plate assembly in accordance with the invention having the power supply mounted thereon.
Figure 4:
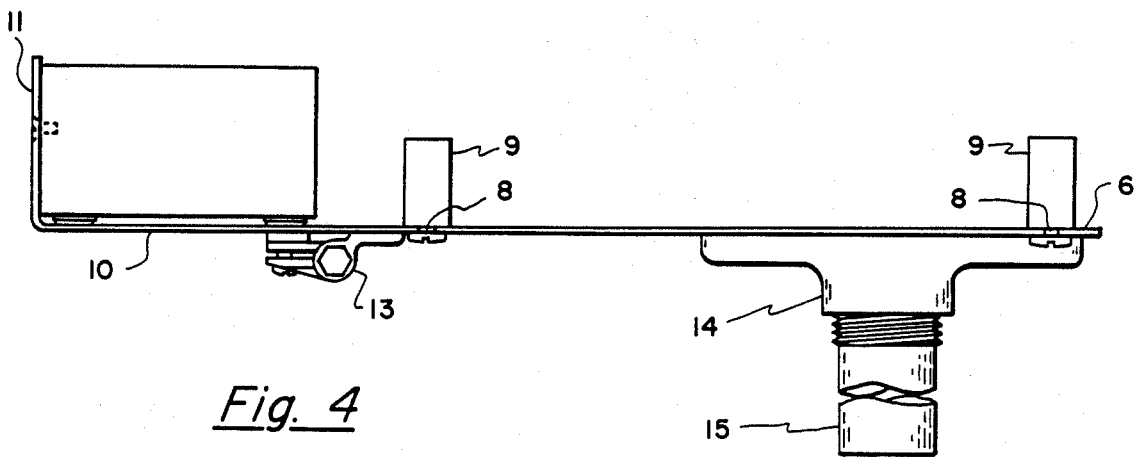
FIG. 4 is a side view of the assembly of FIG. 3.
Figure 5:
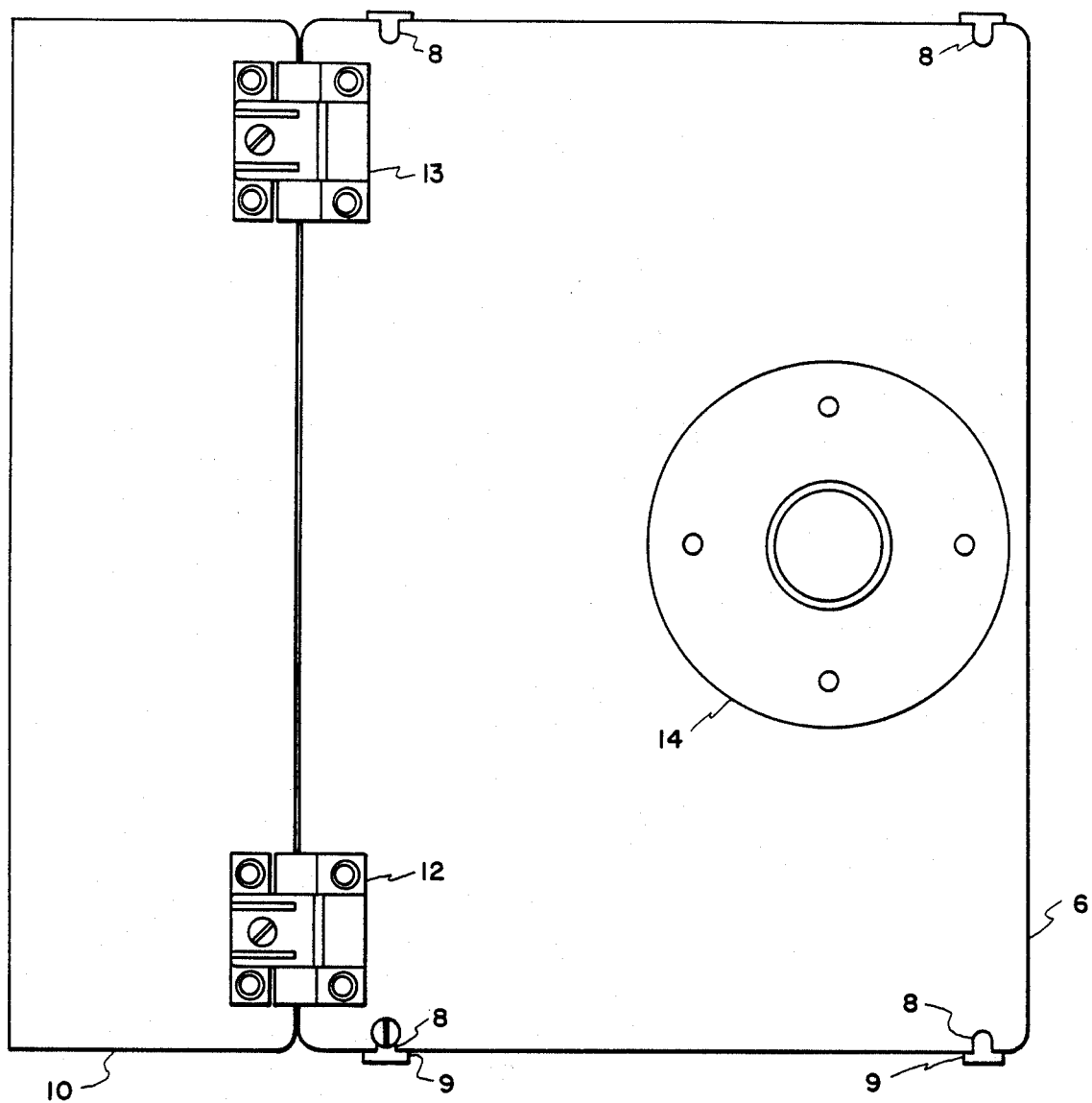
FIG. 5 is a bottom view of the assembly of FIG. 3.

As shown in FIGS. 1 and 2 a computer 1 and a power supply 2 are attached to a plate assembly 3. The computer 1 is attached to the plate assembly 3 by means of brackets 9. The plate assembly 3 includes two plates which are coupled together by means of friction hinges so that the two plates may be placed in the position shown in FIGS. 1 and 2 when the computer is to be used. When the computer is to be stored then the two plates are disposed in the same plane. By means of this plate assembly the power supply is positioned such that air currents may freely flow around the power supply to dissipate any heat. Additionally as shown in FIG. 1 the plates provide a positioning arrangement for the computer assembly such that the computer when set on a table or desk top is placed in a convenient operating position. Where operating space is limited the computer assembly may be placed on a tripod 5 as shown in FIG. 2.

Turning now to FIGS. 3-6 the plate assembly will be described in greater detail. In FIGS. 3-6 the power supply 2 is shown attached to the plate assembly. The plate assembly 3 includes a first plate 6 and a second plate 7. As most clearly seen in FIGS. 4 and 5 the first plate 6 includes notches 8 which capture screws that are attached to brackets 9. As most clearly shown in FIGS. 1 and 2, the brackets 9 engage grooves on the computer 1. The second plate 7 includes a first portion 10 and a second portion 11, the second portion 11 being disposed at right angles to the first portion 10. As more clearly shown in FIG. 4 the power supply 2 is fastened to the second plate 7 by means of screws. The first plate 6 is connected to the second plate 7 by means of two tension adjustable friction hinges 12, 13. The friction hinges 12, 13 are of a type commercially available and permits the two plates 6 and 7 to be moved relative to one another to a desired position. More specifically, plate 10 is chosen to be of such a length that when the computer assembly is placed on a desk top, the keyboard is at a correct ergonomic angle.

Figure 6:
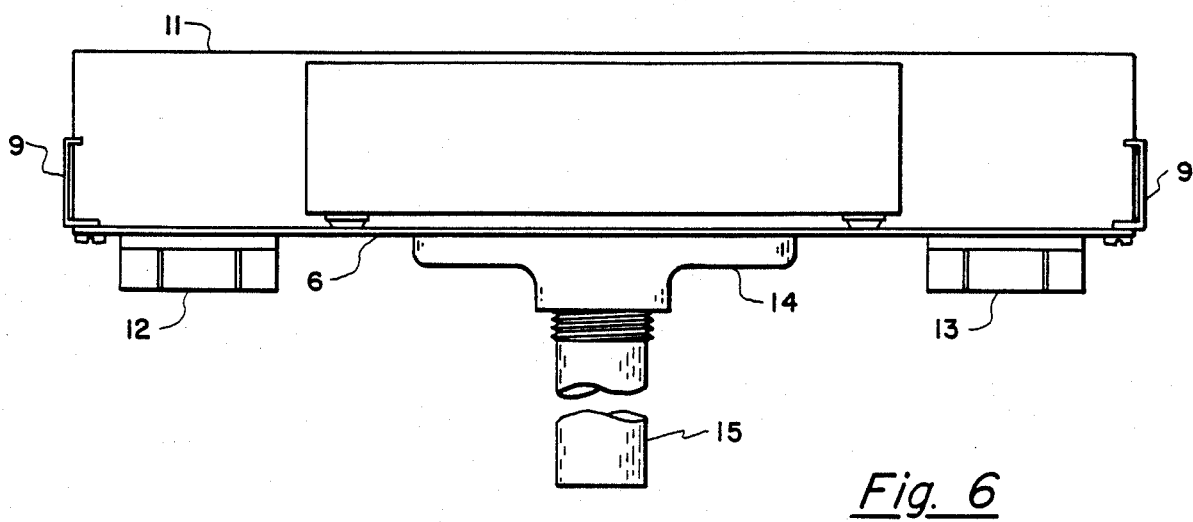
FIG. 6 is a front end view of the assembly of FIG. 3.
Figure 8:
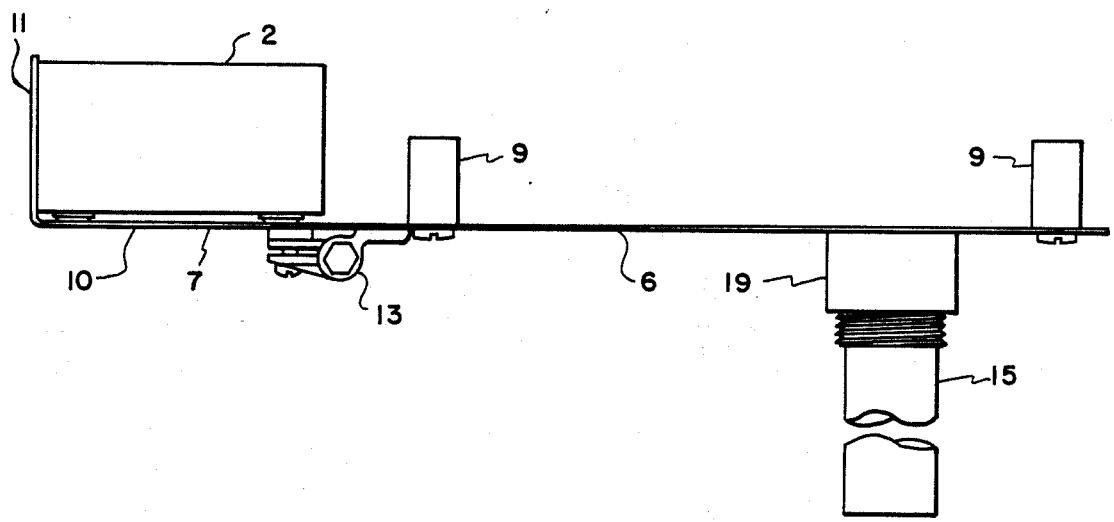
FIG. 8 is a side view of an alternate embodiment of the plate assembly.

A pipe flange 14 may be affixed to the first plate 6 so that the computer assembly may be mounted on a tripod. The pipe flange 14 includes an internally threaded portion adapted to receive a tripod post 15 as shown in FIG. 6 which in turn may be supported by a tripod. Alternately the first plate 6 may have a straight coupling welded thereto for receiving a tripod post. FIG. 8 illustrates such an arrangement with a straight coupling 19.

Figure 7:
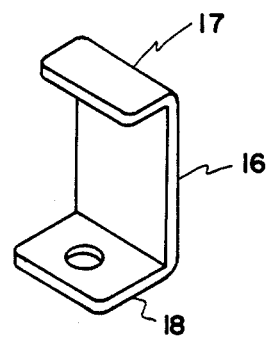
FIG. 7 is a perspective view of one of the brackets used in conjunction with the plates of FIGS. 3-6.

As shown in FIG. 7 the bracket 9 are of straight forward design and are of some what a U shape. The bracket includes a first portion 16 and second and third portions 17 and 18 which are at right angles to the first portion 16. Portion 17 is dimensioned to engage a grove on the computer 1. Portion 18 includes a tapped hole to receive the screw which will engage in a notch 8 on plate 6.

The computer 1 is a commercially available computer and details of the computer itself do not form any part of the present invention. Likewise the power supply 2 is of conventional design and may be a commercially available power supply. Details of the power supply 2 likewise do not form any part of the present invention.

The computer system described above is particularly useful for acquiring data from remote HVAC equipment and displaying the acquired information in various formats. The computer system in particular may have a data base such that the computer can determine from the acquired data if system degradation has occurred, dynamically determine when the service is needed and diagnose problems from the acquired data. This system is particular useful as a portable chiller/cooler maintenance system.

What is claimed is:

1. A portable computer system, comprising:
a computer;
a power supply for said computer;
a plate assembly comprising:
a first plate, a second plate, bracket means, said computer being attached to said first plate by said bracket means, said power supply being attached to said second plate, and hinge means for coupling said first plate to said second plate such that said first plate and said second plate may be placed in substantial planar alignment with each other or may be disposed such that said second plate functions as a foot for said computer assembly, said hinge means serving to retain said first and second plates in a desired position.

2. An assembly in accordance with claim 1, wherein:
said second plate comprises a first portion to which said hinge means is attached, and a second portion disposed at a right angle to said first portion.

3. An assembly in accordance with claim 1 wherein:
said hinge means comprises a friction hinge.

4. A portable computer system, comprising:
a computer;
a power supply for said computer;
a plate assembly comprising:
a first plate, a second plate, bracket means, said computer being attached to said first plate by said bracket means, said power supply being attached to said second plate, and hinge means for coupling said first plate to said second plate such that said first plate and said second plate may be placed in substantial planar alignment with each other or may be disposed such that said second plate functions as a foot for said computer assembly, said hinge means serving to retain said first and second plates in a desired position;
a tripod; and
tripod coupling means carried by said first plate for coupling said assembly to said tripod.

5. An assembly in accordance with claim 4, wherein:
said tripod coupling means comprises a pipe flange affixed to said first plate and a tripod post screwed into said flange.

6. An assembly in accordance with claim 4 wherein:
said tripod mounting means comprises a straight coupling attached to said first plate and adapted to receive a tripod post; and
a tripod post having one end adapted to engage said straight coupling and its other end adapted to be supported by said tripod.

7. An assembly in accordance with claim 4 wherein:
said hinge means comprises a friction hinge.

* * * * *